United States Patent [19]

Beakley

[11] Patent Number: 4,610,320

[45] Date of Patent: Sep. 9, 1986

[54] STABILIZER BLADE

[75] Inventor: Billy Beakley, Lake Charles, La.

[73] Assignee: Directional Enterprises, Inc., Youngsville, La.

[21] Appl. No.: 651,925

[22] Filed: Sep. 19, 1984

[51] Int. Cl.$^4$ .............................................. E21B 10/00
[52] U.S. Cl. .................................. 175/409; 29/527.2; 164/46; 419/9; 419/18; 419/23; 419/35; 419/64; 427/214; 427/405; 428/564; 428/908.8
[58] Field of Search .................... 419/8, 9, 23, 18, 35; 29/527.2; 164/46; 175/409; 428/564, 908.8; 427/214, 405

[56] References Cited

U.S. PATENT DOCUMENTS 3,322,536 5/1967 Stoddard et al. ............... 419/35 X
4,218,494 8/1980 Belmondo et al. ............. 419/35 X Primary Examiner—Stephen J. Lechert, Jr.
Attorney, Agent, or Firm—Keaty & Keaty

[57] ABSTRACT

A method is disclosed for applying hard tungsten carbide particles to the surface of metal stabilizers used in the drilling of oil, gas, geothermal and water wells. The process consists of applying a soft, elastic metal powder to the surface of the substrate. Large tungsten carbide particles, which have also been coated with the soft powder, are placed on top of the layer of soft powder. The particles are then covered with additional soft powder, which powder is then fused to form a homogeneous, large tungsten carbide particle containing mixture bonded to the substrate. A hard matrix is applied and fused over the large tungsten carbide particle containing mixture. The large tungsten carbide particles, which have a low coefficient of expansion, are thereby contained in a soft elastic metal matrix which acts as an expansion and cushion material, while the hard matrix presents a less resilient, more wear resistant surface. This arrangement is advantageous because the coefficient of expansion of the hard matrix material is much higher than the coefficient of expansion of the carbide particles. The soft elastic matrix thereby cushions the carbide particles and prevents them from being crushed as the hard matrix expands and contracts in response to changing temperatures and conditions.

22 Claims, 7 Drawing Figures

STABILIZER BLADE

BACKGROUND OF THE INVENTION

1. Field of the Invention

This invention relates to earth boring equipment used in the rotary system of drilling and more particularly to drill string wall contacting tools for deviation control and/or bit stabilization. This invention specifically concerns the surface of stabilizers used as drill string wall contacting elements in the drilling of oil, gas, geothermal and water wells.

2. Description of the Prior Art

It is known in the art to coat the wear or bearing surfaces of stabilizers with a matrix of nickel and silver containing tungsten carbide particles. This method of preparing stabilizer surfaces suffers from the disadvantage that the nickel silver matrix is soft, having a Rockwell Hardness in the range of Rc 10. This characteristic softness causes the matrix to rapidly be worn away, thereby releasing the embedded tungsten carbide particles and impairing the wear resistance of the stabilizer surface.

Another method commonly used to prepare stabilizer surfaces is to drill a plurality of holes in the surface of a substrate having a Rockwell Hardness in the range of Rc 22–32. Round tungsten carbide particles are then pressed into the drill holes to provide an abrasion resistant surface. A disadvantage of this prior art method is that the substrate must be soft enough to be drilled in the first place, and is accordingly too soft to provide superior wear resistance properties. Another disadvantage is the difficulty of replacing the wear surfaces since they must be cut off with a torch, the area built up with a welding rod, turned to size in a lathe redrilled with holes, and carbide pieces pressed into the holes.

Yet another prior art method is shown in U.S. Pat. No. 3,868,235 issued to Held. The Held patent discloses a method for applying hard carbide particles to the surface of a metal substrate by applying a copper free molten matrix material to the substrate, applying a tacky organic adhesive over the matrix, sprinkling the carbide particles on the adhesive and then baking the layered substrate in a non-oxidizing furnace at a temperature below the melting temperature of the substrate, but high enough to melt the matrix and volatize the adhesive. This process provides porosity to the matrix, but suffers the significant drawback of requiring the presence of a furnace to volatize the adhesive and melt the matrix.

Thus, the two primary drawbacks of the processes shown in the prior art are that the abrasive surfaces provided offer inadequate abrasion resistance and/or require unwieldly, time consuming and expensive procedures in replacing the wear resistant surfaces. Time consuming replacement procedures are especially intolerable in oil-field drilling operations where time consuming delays often translate into the loss of many thousands of dollars.

SUMMARY OF THE INVENTION

The instant invention has solved the significant drawbacks of the prior art by providing a superior wear resistant surface formed by a novel and convenient method that permits repair of worn stabilizer surfaces to take place quickly and inexpensively. The method of this invention comprises applying a soft, elastic metal powder to the surface of a substrate, the soft powder being comprised in preferred embodiments of silicon, boron, and 90–97% nickel by weight of the matrix. Large tungsten carbide particles having maximum dimensions (length or radius) between ¼" and 1" are then coated with the soft metal powder, and the large tungsten carbide particles are then placed on the surface coated with the soft powder. Additional soft elastic powder is sprayed in a heated, fluidized form over the tungsten carbide particles to form a homogeneous, soft mixture containing the large tungsten carbide particles and bonded to the substrate. A hard matrix containing smaller tungsten carbide particles and being comprised in preferred embodiments of chromium, cobalt, iron, carbon, silicon, boron and nickel is then coated over the soft matrix, thereby providing a very hard surface over a softer, more pliant matrix. This arrangment permits the soft, elastic metal to act as an expansion and cushion material which exhibits greater resistance to external stresses, such as those caused by the expansion and contraction of the hard matrix during use. The hard matrix has a much higher coefficient of expansion than the carbide particles, and absent the elastic metal matrix around the carbide particles, the expansion and contraction of the hard matrix would crush the carbide particles and reduce the wear life of the surface. This novel approach appears to be unprecedented in the stabilizer surface art.

BRIEF DESCRIPTION OF THE DRAWINGS

The figures of the drawings show the successive steps in the process described herein. Two embodiments of the process are shown.

FIG. 1 is a partial cross-section of the substrate after the first step of suitably cleaning the substrate surface.

FIG. 2 is a view similar to FIG. 1 showing the step of spraying the soft, elastic metal powder layer upon the substrate to form a soft, elastic layer.

FIG. 3 illustrates the step of placing the coated tungsten carbide particles upon the soft, elastic layer.

FIG. 4 shows the carbide particles and soft, elastic layer being heat sprayed with additional soft, elastic powder to form an homogeneous mixture containing the large carbide particles.

FIG. 5 shows the step of heat spraying the hard matrix over the soft matrix to fuse the hard matrix to the soft matrix and form the stabilizer surface.

DETAILED DESCRIPTION OF THE INVENTION

The substrate 10 may consist of a conventional metal material out of which stabilizers are made. As those skilled in the art will appreciate, there are many relatively hard materials which are conventionally used as substrates, steel being a common choice. The first step in the preferred embodiment of the process is to clean the surface 12 by various conventional cleaning processes to remove foreign material, dirt, grease, previous coatings, etc. In some embodiments of the invention, the surface 12 is roughened by abrading it or bombarding it with a spray of hardened particles. This abrasion of the surface can improve the mechanical interlock between the soft matrix and substrate surface 12.

The stabilizer (i.e. substrate) is then preheated to a minimum of 600° F., preferably to 700°-750° F., and not to exceed 1,000° F. This preheating temperature is maintained during all subsequent operations and helps to avoid causing internal stresses in the substrate during subsequent steps.

Figure 1:
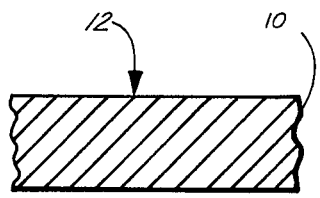
FIGS. 1–5 show the first embodiment while FIGS. 6–7 demonstrate a second embodiment.
Figure 2:
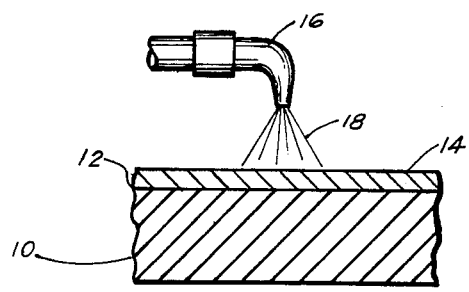

Once the material has been suitably cleaned and preheated, a soft, elastic metal powder layer 14 is applied to the surface 12 of substrate 10 by fluidizing and projecting powder 18 through a sprayer 16. For example, FIG. 2 illustrates spraying powder 18 by means of an oxygen-acetylene sprayer producing a spray 18 of the soft powder. Sprayer 16 is adjusted to spray powder 18 at a temperature below the melting point of powder 18. In preferred embodiments, powder 18 is sprayed at a temperature of about 600°-800° F., or approximately the temperature to which substrabe 10 is heated throughout the process. The exact temperature is not critical as long as it is preferably maintained at a temperature below the melting point of powder 18 being sprayed. Layer 14 does not fuse to surface 12 below the melting point of spray 18, and fusion of layer 14 is not necessary at this point. Accordingly, the expense of heating spray 18 to an elevated temperature can be avoided until a later stage. Nothing in the invention would preclude, however, the use of spraying temperatures about the melting point of powder 18.

In preferred embodiments, the material of which layer 14 is comprised has a Rockwell Hardness in the range of Rc 10-20. Layer 14, can, for example, be comprised of silicon, boron, and 90-97% nickel by weight. The powder in layer 14 comprised of these materials is preferably maintained at a temperature below 1950° F., which is the melting point of this preferred composition. Temperatures in the range of 600°-800° F. are especially preferred.

Large tungsten carbide pieces 20 are prepared in a separate step which may precede or follow the application of layer 14 to substrate 10. Pieces 20 are, in preferred embodiments, washed in a suitable solvent such as acetone to clean the surfaces thereof. Pieces 20 are thereafter handled with tweezers to avoid contamination of the surfaces of pieces 20. A thin layer of the same soft, elastic powder that was used to form layer 14 is then sprayed on the surfaces of pieces 20, which have been preheated to a minimum of 250° F., and a coating 22 is formed on pieces 20 which adheres to the surfaces of said pieces, substantially encapsulating them. The temperature at which the powder is sprayed on pieces 20 is preferably below the melting point (1950° F.) of the coating 22 to avoid unnecessary expenditure of energy heating the powder. Nothing in the invention, however, would preclude use of higher temperatures.

This coating 22 is comprised in preferred embodiments of the same silicon, boron and nickel material as layer 14. Pieces 20, which usually have a length from about ¼" to one inch preferably have a relatively flat surface 24 and are of a substantially uniform diameter. The uniform diameter is desired to facilitate separation using a wire screen.

Figure 3:
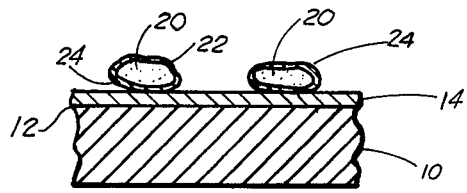

Coated carbide pieces 20 are then placed on layer 14 (see FIG. 3), preferably having the flat surface 24 facing layer 14.

Figure 4:
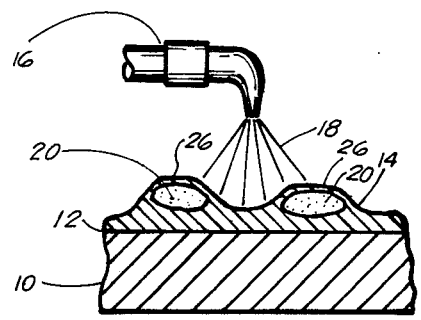

In FIG. 4, the same soft metal powder spray 18 as was applied in FIG. 2 is once again applied from sprayer 16. Spray 18 is, however, now applied at suitable temperatures and spray pressures to achieve fusing of the pieces 20 onto substrate 10. Preferred temperatures in the embodiment described above are about 1950° F. Especially preferred embodiments provide for heating of spray 18 to 1950°-2100° F. The spraying and fusing of spray 18 forms a homogeneous mixture bonded to substrate 10. This homogenous mixture is generally referred to by reference numeral 14, since it is comprised of the same material as layer 14 in FIG. 2. Layer 14 thereby formed is often characterized by having humps 26 formed around pieces 20.

Figure 5:
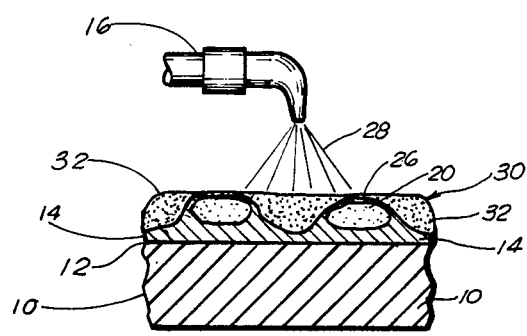

In FIG. 5, sprayer 16 is employed to apply hard matrix spray 28 at a temperature above the melting point of the hard matrix material to the layer 14. Application of spray 28 at this high temperature fuses a hard matrix 30 over the layer 14. Matrix 30 contains smaller carbide particles 32 having maximum dimensions (length or diameter) between about 1/32 inches and ¼ inch. The hard matrix is characterized by having a Rockwell Hardness in the range of Rc 40-60. In the preferred embodiments of the invention described herein, hard matrix 30 is comprised of 10-20% chromium, 0-10% cobalt, less than 10% iron, carbon, silicon and boron and at least 60% nickel. The ratio by weight of matrix 30 to particles 32 is in the range from 1:2 to 2:1. The melting point of the specific layer described herein is about 1950° F., so the spray 18 in FIG. 4 is applied at a temperature above 1950° F., preferably 1950°-2100° F. The high temperature at which spray 28 is applied to layer 24 fuses hard matrix 30 to layer 14, filling in matrix 30 around and over the humps 26 in layer 14.

The final product obtained by this (see FIG. 5) is comprised of a metal substrate 10, which in preferred embodiments is the body of a stabilizer blade. A soft, matrix 14, which has a Rockwell Hardness in the range of Rc 10-20, and in especially preferred embodiments is comprised of silicon, boron, and 90-97% nickel by weight, substantially encapsulates large particles of tungsten carbide 20. Large particles 20, as described above have a maximum dimension (length or diameter) in the range of ¼ inch to one inch. A hard matrix 30 is fused in substantially covering relationship to soft matrix 14. Hard matrix 30 is characterized by having a Rockwell Hardness in the range of Rc 40-60, and in especially preferred embodiments is comprised of 10-20% chromium, 0-10% cobalt, at least 60% nickel, and iron, carbon, silicon and boron being present, the amount not exceeding 10% by weight. A plurality of small tungsten carbide particles 32 are dispersed throughout the material comprising matrix 30. Particles 32 have maximum dimensions (length or radius) in the range of 1/32 inch to ¼ inch. The ratio by weight of metal matrix to smaller carbide particles is preferably in the range from 1:2 to 2:1, and in especially preferred embodiments it is 1:1.

Figure 6:
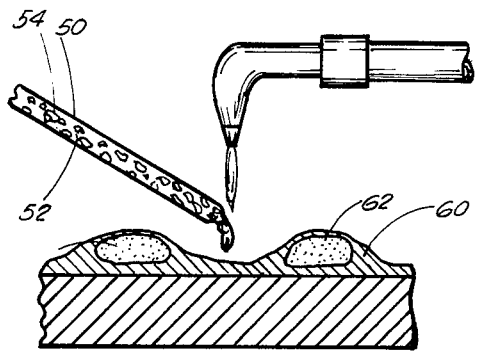
FIG. 6 shows a fragmentary, cross-section of an alternate embodiment of the invention in which the hard matrix is applied by melting a rod which is comprised of the same material as the hard matrix.
Figure 7:
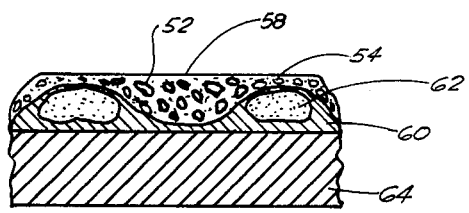
FIG. 7 is a view similar to FIG. 5, showing in cross-section a finished stabilizer having a substrate, intermediate soft matrix, and top layer of hard matrix.

An alternate method for applying the hard matrix is shown in FIGS. 6 and 7. FIG. 6 shows a hard rod 50 which is comprised of the same material as the hard matrix 30 described above. This embodiment permits use of a mixture of various sizes of carbide carbide particles 52, 54, particle 52 being larger than particle 54. It is possible to use less uniform, and larger, particles because the particles 52, 54 do not need to pass through a spray nozzle, as was the case in the embodiment shown in FIG. 5.

FIG. 6 shows the hard rod 50 being melted with a conventional oxy-acetylene torch 56 while being subjected to a melt temperature in excess of 1950° F. for preferred embodiments. In FIG. 7 the large and small carbide particles 52, 54 are homogeneously mixed with the hard matrix 58 over a soft matrix 60 which has the same characteristics and composition as layer 14 described above. Matrix 60 has been fused to substrate 64 in a fashion analogous to the fusing of layer 14 to substrate 10 described above. Matrix 60 contains large tungsten carbide particles 62 which have diameters between ¼ inch and 1 inch.

The approximate diameters of particles 52, 54 preferably vary in a range from about 1/32 inch to ¼ inch.

Having fully described an operative embodiment of the invention, I claim:

1. Method for applying hard tungsten carbide particles to the surface of a metal substrate, comprising:
    applying a soft, elastic metal powder to the surface of said substrate;
    coating large tungsten carbide particles having a maximum dimension at least within the range of more than ¼ of an inch and less than 1 inch with said soft elastic metal powder;
    placing said coated large tungsten carbide particles on the surface of the substrate coated with the soft, elastic metal powder;
    dispersing additional soft elastic metal powder over the tungsten carbide particles, and fusing said powder to form a homogeneous, large tungsten carbide particle containing mixture bonded to the substrate; and
    applying and fusing a hard matrix over said large tungsten carbide particles containing mixture, the hard matrix containing smaller tungsten carbide particles having a maximum dimension at least within the range of more than 1/32 of an inch and less than ¼ of an inch.

2. The method of claim 1, wherein said soft, elastic metal powder has a Rockwell Hardness in the range of Rc 10-20.

3. The method of claim 2 wherein said soft, elastic metal powder is comprised of silicon, boron, and 90-97% of nickel by weight.

4. The method of claim 1, wherein said hard matrix has a Rockwell Hardness in the range of Rc 40-60.

5. The method of claim 4 wherein said hard matrix is comprised of 10-20% chromium, 0-10% cobalt, iron, carbon, silicon and boron being present, not exceeding 10% by weight, and at least 60% nickel by weight.

6. The method of claim 5 wherein the ratio by weight of hard matrix to smaller carbide particles is in the range from 1:2 to 2:1.

7. The method of claim 6 wherein the ratio by weight of metal matrix to smaller carbide particles is 1:1.

8. The method of claim 7 wherein the step of applying additional powder over the carbide particles and fusing said powder to form a homogeneous mixture is achieved with an acetylene/oxygen torch which sprays the powder at 1950°-2100° F. to fluidize said powder as it is sprayed and fuse the powder to the substrate and large carbide particles upon contact with them.

9. The method of claim 8 wherein the step of applying and fusing a hard matrix over said carbide particle containing mixture is achieved by spraying the hard matrix material in molten form from an oxygen/acetylene torch at about 1950°-2100° F.

10. The method of claim 8 wherein the step of applying and fusing a hard matrix over said large carbide particle containing mixture is achieved by first forming a hard rod comprised of the material which is to form the hard matrix and then melting the rod over said large carbide particle containing mixture.

11. Method of applying hard tungsten carbide particles to the surface of a metal substrate comprising:
    applying a soft, elastic metal powder to the surface of said substrate, said powder having a Rockwell Hardness in the range of Rc 10-20 and being comprised of silicon, boron, and 90-97% nickel by weight of the matrix;
    coating large tungsten carbide particles having maximum dimensions at least within the range of more than ¼ of an inch and less than 1 inch with said soft elastic metal powder;
    placing said coated large tungsten carbide particles on the surface of the substrate coated with the soft, elastic metal powder;
    spraying additional, soft elastic metal powder over the tungsten carbide particles with a torch which sprays the powder in fluidized form over the tungsten carbide particles to fuse said soft metal powder to the substrate and large tungsten carbide particles and form a homogeneous, large tungsten carbide particle containing mixture bonded to the substrate; and
    applying and fusing a hard matrix over said large tungsten carbide particle containing mixture, the hard matrix containing smaller tungsten carbide particles having maximum dimensions at least within the range of more than 1/32 of an inch and less than ¼ of an inch and said hard matrix in fluidized form through and acetylene/oxygen sprayer at about 1950°-2100° F., said hard matrix being comprised of 10-20% chromium, 0-10% cobalt, at least 60% nickel and iron, carbon, silicone and boron being present, not exceeding 10% by weight, the ratio by weight of metal matrix to smaller carbide particles being in the range from 1:2 to 2:1.

12. The method of claim 11 wherein the ratio by weight of metal matrix to smaller carbide particles is 1:1.

13. Method of applying hard tungsten carbide particles to the surface of a metal substrate, comprising:
    applying a soft, elastic metal powder to the surface of said substrate, said powder having a Rockwell Hardness in the range of Rc 10-20 and being comprised of silicon, boron, and 90-97% nickel by weight of the matrix;
    coating large tungsten carbide particles having diameters within the range of more than ¼ of an inch and 1 inch with said soft elastic metal powder;
    placing said large tungsten carbide particles on the surface of the substrate which has been coated with the soft, elastic metal powder;
    spraying additional, soft elastic metal powder over the large carbide particles with an acetylene/oxygen torch which sprays the powder in fluidized form over the tungsten carbide particles at 1950°-2100° F. to form a homogeneous, large tungsten carbide particle containing mixture bonded to the substrate;
    applying and fusing a hard matrix having a Rockwell Hardness of Rc 40-60 over said large tungsten carbide particle containing mixture by forming a hard rod comprised of the material which is to form the hard matrix and then melting the rod over said large tungsten carbide particle containing mixture.

14. Method for applying hard tungsten carbide particles to a metal substrate, comprising:
providing a substrate;
applying and fusing a soft matrix to said substrate, said soft matrix (being characterized by) having a Rockwell Hardness in the range of Rc 10-20 and having dispersed in said soft matrix a plurality of large tungsten carbide having maximum dimensions at least within the range of more than about ¼ inch and 1 inch; and
applying and fusing a hard matrix in substantially covering relationship to said soft matrix, the hard matrix having a Rockwell Hardness in the range of Rc 40-60 and having dispersed in said hard matrix a plurality of small tungsten carbide particles having maximum dimensions at least within the range of 1/32 inch and less than ¼ inch.

15. A stabilizer blade for use in drilling comprising:
a substrate;
a soft matrix fused to said substrate, said soft matrix substantially encapsulating large particles of tungsten carbide, said large particles having a maximum dimension at least within the range of more than ¼ inch to one inch;
a hard matrix fused in substantially covering relationship to said soft matrix, said hard matrix having a plurality of small tungsten carbide particles dispersed therein, said small particles having a maximum dimension at least within the range of 1/32 inch and less than ¼ inch.

16. The stabilizer blade of claim 15 wherein said soft matrix has a Rockwell Hardness in the range of Rc 10-20.

17. The stabilizer blade of claim 16 wherein said soft matrix is comprised of silicon, boron, and 90-97% nickel by weight.

18. The stabilizer blade of claim 15 wherein said hard matrix has a Rockwell Hardness in the range of Rc 40-60.

19. The stabilizer blade of claim 18 wherein said hard matrix is comprised of 10-20% chromium, 0-10% cobalt, at least 60% nickel, and less than 10% iron, carbon, silicon and boron by weight of matrix.

20. The stabilizer blade of claim 19 wherein the ratio by weight of metal matrix to smaller carbide particles is in the range from 1:2 to 2:1.

21. The stabilizer blade of claim 20 wherein the ratio by weight of metal matrix to smaller carbide particles is 1:1.

22. A stabilizer blade for use in drilling, comprising:
a substrate;
a soft matrix of silicon, boron, and 90-97% nickel by weight of matrix fused to said substrate, said soft matrix substantially encapsulating large particles of tungsten carbide, said large particles having a maximum dimension at least within the range of more than ¼ inch to one inch;
a hard matrix comprised of 10-20% chromium, 0-10% cobalt, at least 60% nickel, and iron, carbon, silicon and boron, being present, not exceeding 10% by weight, said hard matrix fused in substantially covering relationship to said soft matrix, said hard matrix further having a plurality of small tungsten carbide particles dispersed therein, said small particles having a maximum dimension at least within the range of 1/32 inch to less than ¼ inch, the ratio by weight of hard matrix to smaller carbide particles being 1:1.

* * * * *